United States Patent
An et al.

(10) Patent No.: US 6,572,668 B1
(45) Date of Patent: Jun. 3, 2003

(54) CYCLONE DUST COLLECTOR IN VACUUM CLEANER

(75) Inventors: Hyeok Seong An, Kyongsangnam-do (KR); Kyeong Seok Lim, Kyongsangnam-do (KR); Dong Jin Kwak, Kyongsangnam-do (KR); Bong Seok You, Kyongsangnam-do (KR); In Cheol Yun, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/914,230

(22) PCT Filed: Feb. 23, 2000

(86) PCT No.: PCT/KR00/00142

§ 371 (c)(1),
(2), (4) Date: Aug. 24, 2001

(87) PCT Pub. No.: WO00/49933

PCT Pub. Date: Aug. 31, 2000

(30) Foreign Application Priority Data

Feb. 24, 1999 (KR) ............................................. 99-06151
Apr. 23, 1999 (KR) ............................................. 99-14682

(51) Int. Cl.$^7$ ............................................. B01D 45/12
(52) U.S. Cl. ...................... 55/428; 55/459.1; 55/DIG. 3
(58) Field of Search ................ 55/459.1, 428, 55/DIG. 3

(56) References Cited

U.S. PATENT DOCUMENTS

| 4,265,640 A | * | 5/1981 | Bielefeldt ..................... 55/391 |
| 5,009,784 A | * | 4/1991 | Clarke et al. ................ 209/728 |
| 5,549,059 A | | 8/1996 | Nechvat et al. |

FOREIGN PATENT DOCUMENTS

| JP | 3065544 | 6/1991 |
| JP | 4346857 | 12/1992 |
| JP | 5123609 | 5/1993 |

* cited by examiner

Primary Examiner—Robert A. Hopkins
(74) Attorney, Agent, or Firm—Birch, Stewart, Kolasch & Birch, LLP

(57) ABSTRACT

A cyclone collector for a vacuum cleaner is disclosed. The cyclone collector comprises a cylindrical cyclone body, an air inlet connected in the middle of an outer circumference of the cyclone body in a tangential direction, dust outlets connected to both ends of the outer circumference of the cyclone body in a tangential direction, a dust box in communication with the dust outlets for collecting dust coming through the dust outlets, a pair of air outlet tubes for discharging an air inside of the cyclone body, and a guide piece provided in the middle of an inside surface of the cyclone body for smoothly dividing and guiding the air drawn through the air inlet to the air outlet tubes, respectively.

17 Claims, 10 Drawing Sheets

US 6,572,668 B1

CYCLONE DUST COLLECTOR IN VACUUM CLEANER

This application is the national phase under 35 U.S.C. §371 of PCT International Application No. PCT/KR00/00142 which has an International filing date of Feb. 23, 2000, which designated the United States of America and was published in English.

TECHNICAL FIELD

The present invention relates to a vacuum cleaner, and more particularly, to a cyclone collector which can collect various contaminants, such as dust, by using the cyclone principle.

BACKGROUND OF THE RELATED ART

In general, the cyclone collector which is mostly used as a domestic vacuum cleaner only carries out dust collection by collecting contaminants contained in air by using a centrifugal force, and discharging the air outside of the cyclone collector. One example of the related art cyclone dust collector will be explained with reference to FIGS. 1 to 3.

The related art cyclone collector is provided with a cylindrical cyclone body 1 integrated to an underside thereof having a cone part 1a with a diameter becoming the smaller as it goes the more to downward, an air inlet 2 provided to an appropriate place of an upper portion of an outer circumference of the cyclone body 1 in a tangential direction horizontally, a cylindrical air outlet 3 on a top center of the cyclone body 1 for discharging the air drawn into the cyclone body upward, a dust outlet 4 on a bottom of the cone part 1a for discharging the contaminants (dust, string pieces, paper pieces and the like)drawn into the cyclone body 1 downward, a dust box 5 under the dust outlet 4 for collecting the contaminant discharge through the dust outlet 4. The dust box 5 is detachable from the dust outlet 4.

A process for collecting dust in the related art cyclone collector for a cleaner will be explained.

When a suction force is generated by an action of separate suction force generating means (not shown) in the vacuum cleaner, the air is drawn into the cyclone body 1 through the air inlet 2. In this instance, the air is drawn in a tangential direction to the cyclone body 1 horizontally. The air drawn into the cyclone body 1 together with the contaminant moves downward as the air continues to circulate along an inside circumference of the cyclone body. In this instance, the air and the contaminants have different centrifugal forces applied thereto due to difference of weight. That is, the air with a weight close to zero has almost no centrifugal force applied thereto, while the dust with a relatively heavy weight has a centrifugal force applied thereto, to circulate along an inside wall of the cyclone body. Accordingly, the contaminants comparatively heavier than the air continues to drop as the contaminants circulates along an inside circumference surface of the cone part 1a, and enters into the dust box 5 through the dust outlet under the bottom of the cone part 1a, and the air is discharged to outside of the cyclone body 1 through the air outlet 3. In a case when there is the dust collected in the dust box 5, the collected dust is removed after the dust box 5 is detached from the cyclone body.

However, the related art cyclone collector has the following problems.

First, the backward, not forward, air flow causes a great suction air resistance and noise. That is, the air drawn through the air inlet 2 is separated from the contaminants by the centrifugal force and discharged outside of the cyclone body, when the discharged air acts as a resistor to the air drawn through the air inlet, with a pressure loss caused, that drops a dust collecting efficiency and puts a more load on the motor.

Second, a suction force and a discharge force are almost the same as the air drawn into the cyclone body through the air inlet is discharged through the air outlet as it is. According to this, since a portion of fine dust is discharged to outside of the collector together with discharged air again, a dust collecting capability is dropped. Therefore, in a vacuum cleaner application of the dust collector, there has been no way but to provide an additional filter inside of the body of the vacuum cleaner.

Third, the dust box can not but be disposed right under the cone part of the cyclone body 1. Therefore, in the case of vacuum cleaner application, when it is intended to remove the contaminants collected in the dust box 5, only the dust box can not but be detached from the cyclone body, leaving the cyclone body as it is, which is difficult in using and managing the vacuum cleaner. Particularly, in a case of a canister type vacuum cleaner application of the cyclone collector, because the dust box 5 is disposed right under the cyclone body 1, the cyclone body 1 should be taken out of the vacuum cleaner body before the dust box 5 is separated from the cyclone body.

Fourth, the dust collector is tall, which leads an overall height of a canister type application or an upright type application high, that in turn leads the cleaner large sized.

DISCLOSURE OF INVENTION

Accordingly, the present invention is directed to a cyclone collector for a vacuum cleaner that substantially obviates one or more of the problems due to limitations and disadvantages of the related art.

An object of the present invention is to provide a cyclone collector for a vacuum cleaner, which has a low pressure loss with a reduced air discharge force for preventing discharge of fine dust, and an improved dust collecting efficiency.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the cyclone collector for a vacuum cleaner includes a cylindrical cyclone body, an air inlet connected in the middle of an outer circumference of the cyclone body in a tangential direction, dust outlets connected to both ends of the outer circumference of the cyclone body in a tangential direction, dust boxes in communication with the dust outlets for collecting dust coming through the dust outlets, and an air outlet tube for discharging the air flowing in the cyclone body with the air divided two or more than two.

In the other aspect of the present invention, there is provided a cyclone collector for a vacuum cleaner including a cylindrical cyclone body, an air inlet in one end of an outer circumference surface of the cyclone body for drawing air and contaminants into the cyclone body in a tangential direction, an air outlet tube on a center portion of the cyclone body having two inlets and one outlet for discharging the air separated by a centrifugal force from the air and contaminants drawn into the cyclone body, a dust outlet connected to the other end of the outer circumference surface of the cyclone body for discharging contaminants separated by the centrifugal force from the air and contaminants drawn into the cyclone body, and a dust box detachably coupled to the dust outlet for collecting the discharged dust.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIGS. 7A and 7B illustrate examples of installation of the cyclone collector in accordance with a first preferred embodiment of the present invention, wherein FIG. 7A illustrates a section showing a state a direction of contaminant discharge through the dust outlet is upward, and FIG. 7B illustrates a section showing a state a direction of contaminant discharge through the dust outlet is horizontal;

BEST MODE FOR CARRYING OUT THE INVENTION

Figure 1:
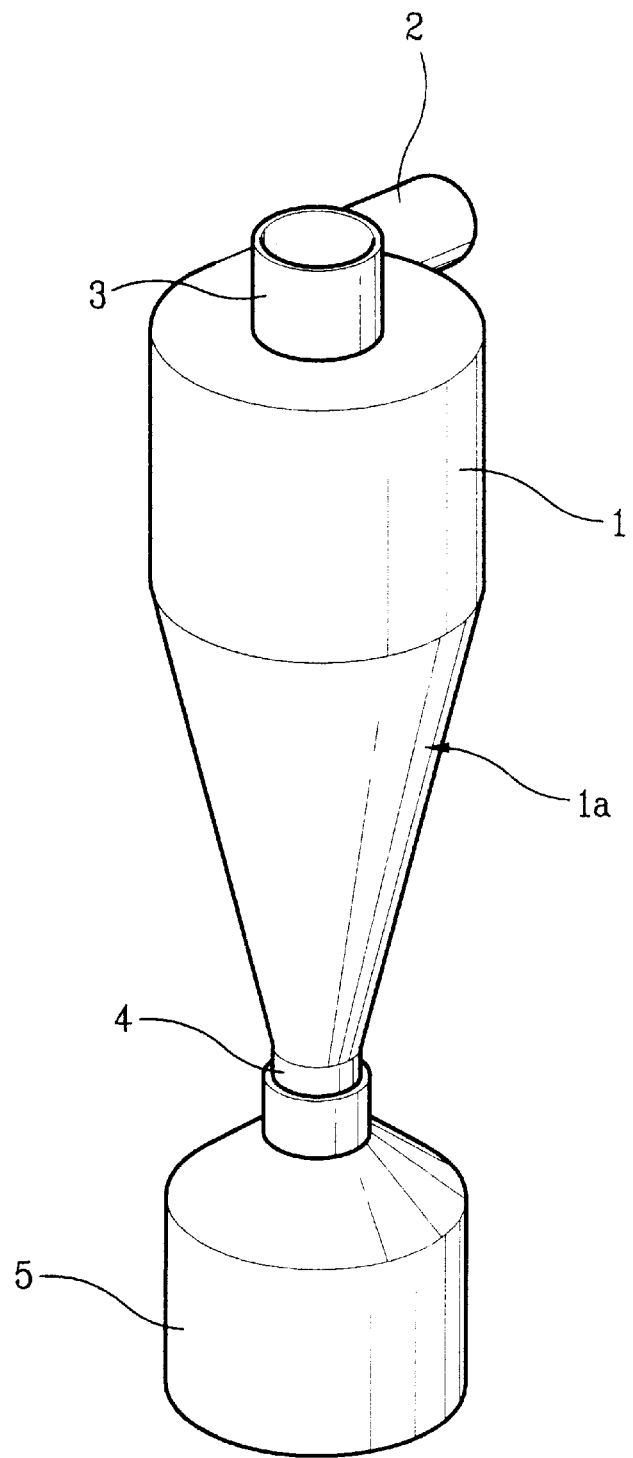
FIG. 1 illustrates a perspective view of a related art cyclone collector.
Figure 2:
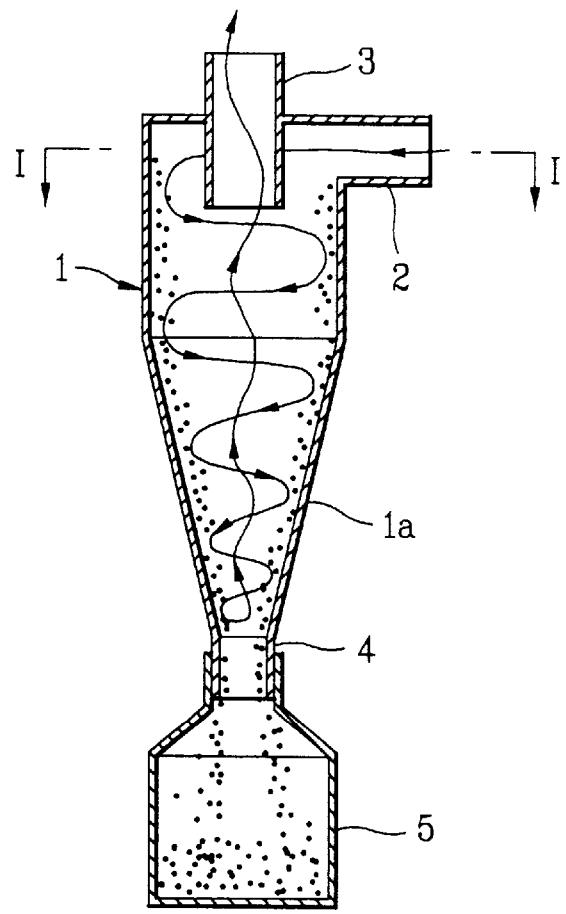
FIG. 2 illustrates a section of a related art cyclone collector.
Figure 3:
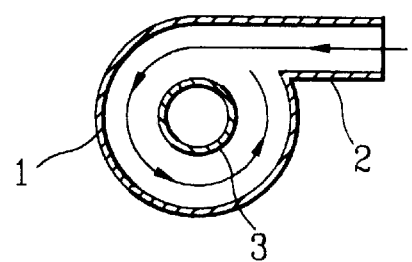
FIG. 3 illustrates a section across line I—I in FIG. 2.
Figure 4:
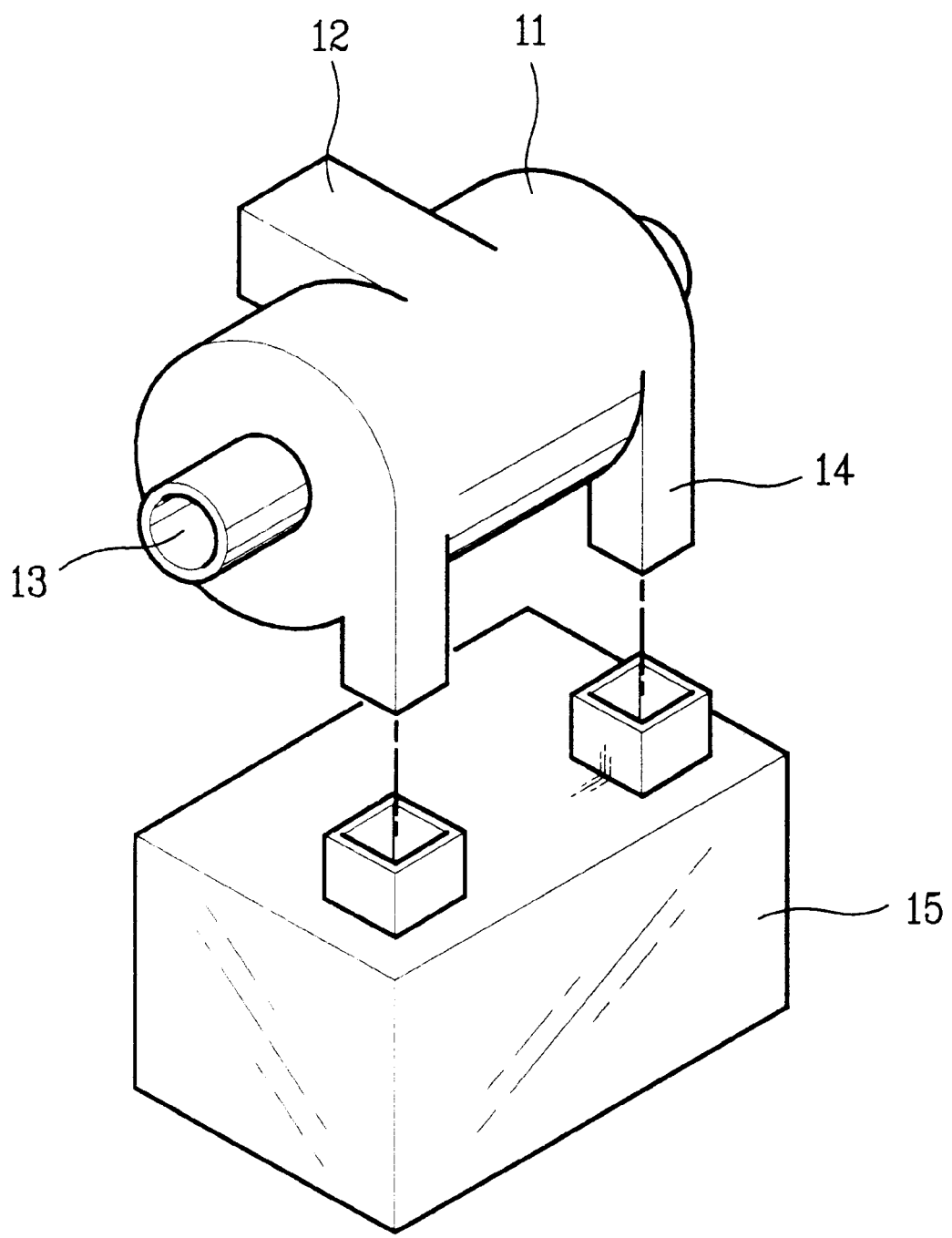
FIG. 4 illustrates a perspective view of a cyclone collector in accordance with a first preferred embodiment of the present invention.
Figure 5:
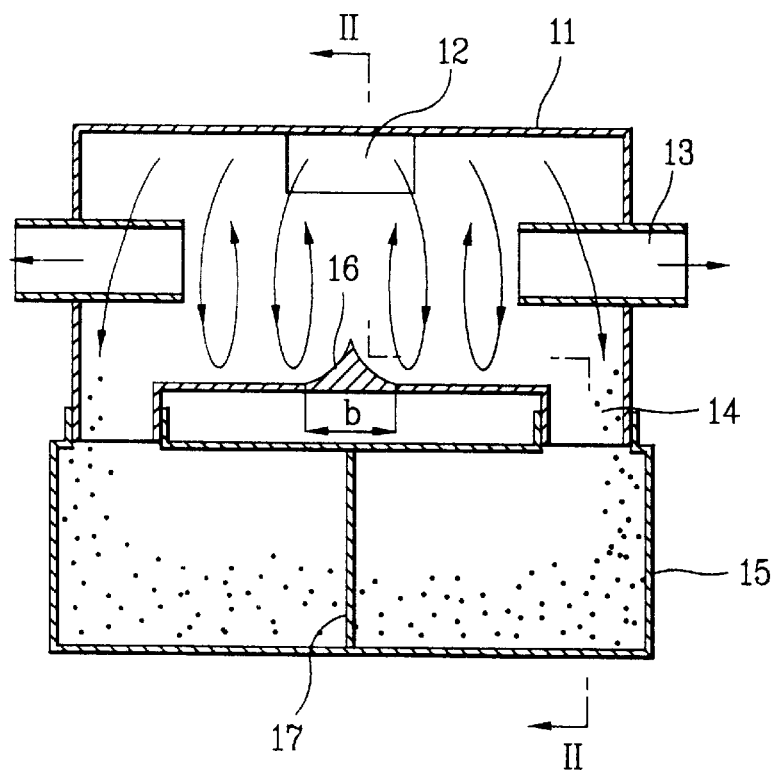
FIG. 5 illustrates a section of the cyclone collector shown in FIG. 4.
Figure 6:
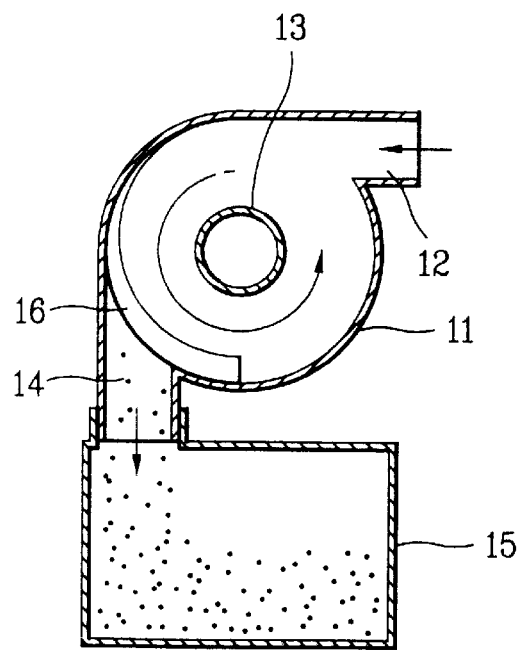
FIG. 6 illustrates a section across line II—II in FIG. 5.

Reference will now be made in detail to the preferred embodiments of the present invention, examples of which are illustrated in the accompanying drawings. A first preferred embodiment of the present invention will be explained with reference to attached FIGS. 4 to 7B. FIG. 4 illustrates a perspective view of a cyclone collector in accordance with a first preferred embodiment of the present invention, FIG. 5 illustrates a section of the cyclone collector shown in FIG. 4, and FIG. 6 illustrates a section across line II—II in FIG. 5.

The cyclone collector in accordance with a first preferred embodiment of the present invention includes a cylindrical cyclone body 11 having the same diameter in an entire portion, an air inlet 12 in the middle of the cyclone body for drawing the air in a tangential direction to the cyclone body 11, and cylindrical air outlets 13 at centers of opposite sides of the cyclone body 11 for dividing the air drawn into the cyclone body into substantially two portions and discharging in horizontal direction through different paths. And, there are dust outlets 14 at opposite ends of the cyclone body 11 for dividing the contaminants(dust, string pieces, and paper pieces and the like) drawn into the cyclone body together with the air into two portions and discharging by a substantially half in a tangential direction to a circumference of the cyclone body 11 through different paths, and a dust box 15 detachably coupled with each end of the dust outlets for collecting contaminants discharged through the dust outlet. And, there is a flow dividing guide 16 in the middle of an inside circumference of the cyclone body 11 formed to have a length starting from the air inlet 12 along the circumference, a height which becomes the higher as it goes the farther from the air inlet 12, and a section curved from a top portion to bottom portion in both directions, for smooth division of the air, drawn into the cyclone body 11 through the air inlet 12 in a tangential direction, into both sides where the air outlets 13 are formed therein, and having a centrifugal force applied thereto. The flow dividing guide 16 is formed such that a contact width 'b' (see FIG. 5) with the cyclone body 11, and a height of the flow dividing guide 16 are made gradually the wider as it goes the farther starting from the air inlet 12, for effective division of the air in both directions by the flow dividing guide 16 and flowing of the air toward the air inlets 13. In the meantime, it is preferable that there is a partition plate 17 in the dust box 15 for dividing the inside space, for preventing floatation of contaminants in the dust box 15 as the air flow from the dust outlets 14 of the cyclone body 11 collides and circulates in the dust box 15.

The dust collection operation of the cyclone collector in accordance with a first preferred embodiment of the present invention will be explained.

First, external air is drawn into the cyclone body 11 through the air inlet 12 in the middle of the cyclone body 11 in a tangential direction by suction of an additional suction force generating means(not shown). The external air contains various contaminants, such as dust and string pieces. The air, drawn into the cyclone body through the air inlet, is divided substantially into two portions by the flow dividing guide 16 formed in the middle of the cyclone body 16 and flows in different flow paths. Of the air introduced into the cyclone body 11, pure air and the contaminants are subjected to different strength of centrifugal forces due to a weight difference, that causes the pure air and the contaminants to show different flow characteristics as follows.

First, flow of the contaminants in the drawn air will be discussed.

The contaminants in the air, drawn into the cyclone body 11 and divided substantially into two portions by the flow dividing guide 16, flows in different two flow paths, and enters into the dust boxes 15 through different dust outlets 14. That is, while the contaminants keeps circulating along an inside circumference of the cyclone body 11 by the centrifugal force, the contaminants relatively heavier than the pure air move until the contaminants reach to opposite ends of the cyclone body where the contaminants are discharged in a tangential direction through different dust outlets 14 at opposite ends of the cyclone body. The discharged contaminants enter into the dust boxes 15 at the ends of the dust outlets detachably attached thereto, and collected therein. In the meantime, since the flow guide 16, in the middle of the inside surface of the cyclone body 11 with a length along a circumference direction and a curved section starting from a top to a bottom thereof in opposite directions, has a contact width 'b' with the cyclone body 11 becoming wider as it goes the farther from the air inlet 12, and a height becoming the higher as it goes the farther from the air inlet 12, the divided air can be guided the more smoother.

The flow of the discharged air will be discussed.

The pure air, excluding the contaminants in the drawn air introduced into the cyclone body 11 and divided into substantially two portions by the flow dividing guide 16, flows along two paths different from each other, and discharged through air outlets 13 formed at opposite sides of the cyclone body, respectively. That is, since the pure air in the air drawn through the air inlet has a light weight almost negligible compared to the contaminants, the pure air forms a discharge current at a center portion of the cyclone body 11, and is discharged through the air outlets 13 formed at centers of opposite sides of the cyclone body 11. In the meantime, the contaminants discharged in a tangential direction through the dust outlets 14 in opposite sides of the cyclone body 11 are separated by the partition plate 17 to be prevented from colliding to each other, thereby preventing the contaminants from floating for a prolonged time period in the dust box 15. And, the air drawn into the cyclone body 11 through the air inlet 12 are divided into substantially two portions and discharged in horizontal directions through the air outlets 13 formed in opposite sides of the cyclone body. According to this, since an air discharge force of the air discharged through the air outlets 13 is dropped below a half of the air suction force of the air drawn through the air inlet 12, the discharge of comparatively light fine dust to outside of the cyclone collector carried on a pure air flow is reduced, significantly. In the meantime, the first embodiment cyclone dust collector with its forward type natural air flow permits to have a significantly reduced pressure loss, together with reduced required power, and an improved dust collecting efficiency. In the meantime, when it is intended to remove the contaminants from the dust box 15, the dust box 15 is detached from the cyclone body, and, after the contaminants are removed from the dust box 15, the dust box 15 is coupled to the dust outlet 14, wherein, though the dust box 15 is divided into two portions by the partition plate 15a, for collecting the contaminants discharged through the dust outlets 14 in independent spaces, the contaminants may be collected in one space with the contaminants mixed without dividing the space into two spaces, additionally.

Figure 7A:
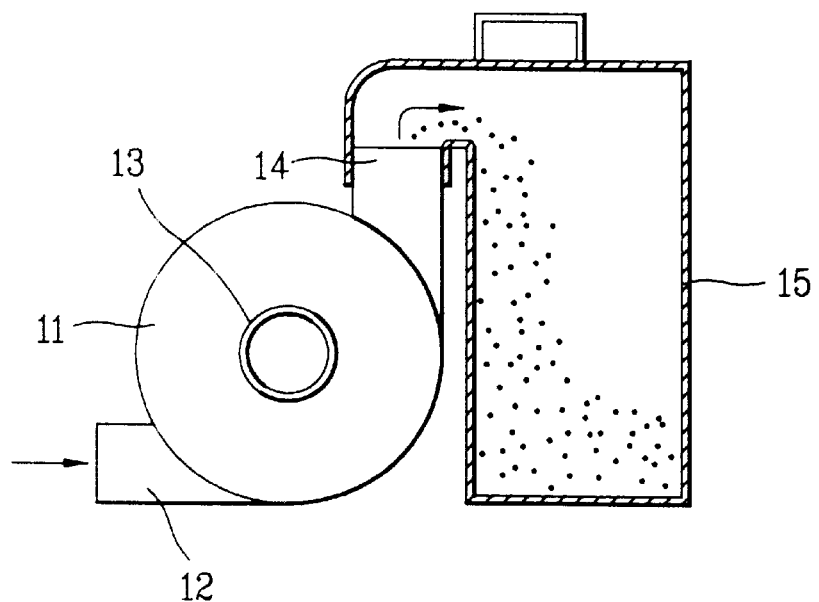
Figure 7B:
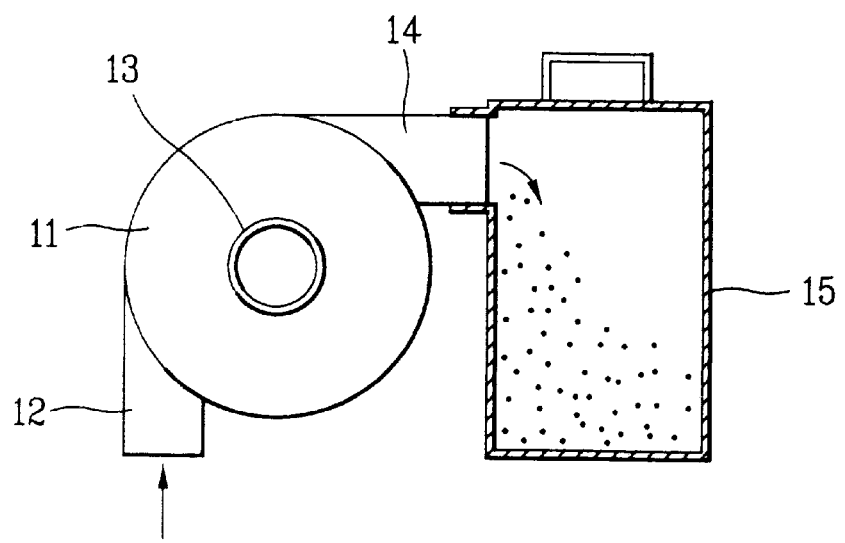

FIGS. 7A and 7B illustrate examples of installation of the cyclone collector in accordance with a first preferred embodiment of the present invention.

When the cyclone collector of the present invention is applied to a canister type vacuum cleaner, the cyclone collector is installed inside of the cleaner body(not shown) or on a flow passage(an extension tube or connection hose) connecting a suction nozzle and the body. Particularly, when the cyclone collector is installed inside of the cleaner body, it is preferable that a direction of the contaminant discharge through the dust outlet 14 is put upward as shown in FIG. 7A or horizontal as shown in FIG. 7B, and the dust box 15 connected to the dust outlet 14 is installed side by side with the cyclone body 11 for easy detach of the dust box 15 for removal of the dust. That is, when the cyclone collector and the dust box are connected as shown in FIG. 6, as the height of the cleaner should be high, though the cleaner is suitable for an up-right type vacuum cleaner, the cleaner is not suitable for the canister type vacuum cleaner. Therefore it is preferable that the cyclone body and the dust box are installed side by side in a horizontal direction as shown in FIGS. 7A and 7B.

Figure 8:
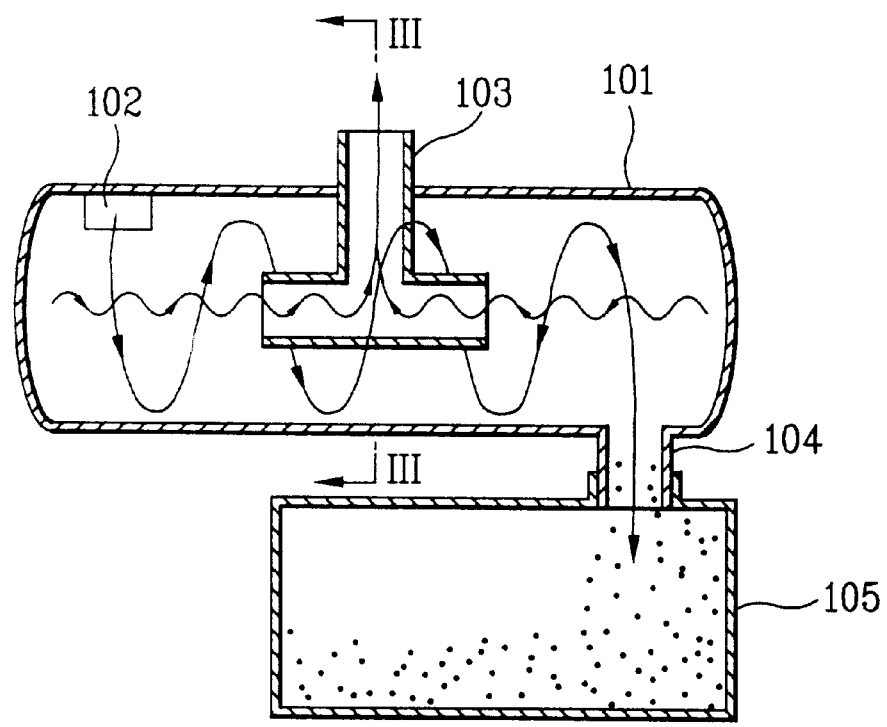
FIG. 8 illustrates a section of a cyclone collector for a vacuum cleaner in accordance with a second preferred embodiment of the present invention.
Figure 9:
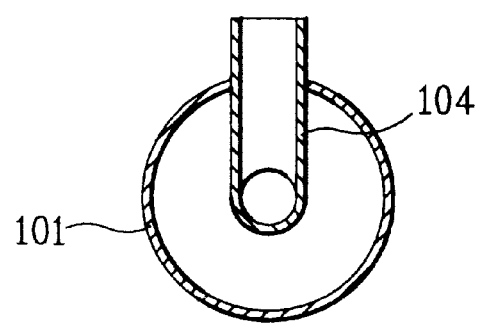
FIG. 9 illustrates a section across III—III in FIG. 8.

A cyclone collector for a vacuum cleaner in accordance with a second preferred embodiment of the present invention will be explained with reference to FIGS. 8 and 9. FIG. 8 illustrates a section of a cyclone collector for a vacuum cleaner in accordance with a second preferred embodiment of the present invention, and FIG. 9 illustrates a section across III—III in FIG. 8.

The cyclone collector for a vacuum cleaner in accordance with a second preferred embodiment of the present invention includes a cylindrical cyclone body 101, an air inlet 102 in one end of the cyclone body 101 for leading air and contaminants in a tangential direction to the cyclone body 101. And, there is an air outlet tube 103 of a 'T' formed tube having two inlets and one outlet on an axis of the cylindrical cyclone body 101 for discharging air separated by a centrifugal force from the air and contaminants drawn into the cyclone body 101, a dust outlet 104 in the other end of the cyclone body 101 for discharging the contaminants separated by the centrifugal force from the air and contaminants drawn into the cyclone body, and dust box 105 connected to the dust outlet for collecting the discharged contaminants. And, opposite ends of the cyclone body 101 have convex forms in appropriate curvatures outwardly for effective convergence of the air to the opposite inlets of the air outlet tube 103.

The dust collection operation of the aforementioned cyclone collector in accordance with a second preferred embodiment of the present invention will be explained.

As a suction force is generated by rotation of the fan by a driving force of the motor(not shown) mounted on the cleaner body separately, external air and contaminants are introduced into the cyclone body 101 through the air inlet connected tangential to the cyclone body 101 at one end thereof. The air and contaminants introduced into the cyclone body 101 through the air inlet 102 are subjected to a centrifugal force, to circulate along an inside surface of the body as the air and contaminants move to the other side, when the air and contaminants have different centrifugal forces applied thereto. As pure air has almost no centrifugal force applied thereto, the pure air passes through a center portion of the cyclone body 101 and is discharged outside of the cyclone body through the air outlet tube 103, and the contaminants heavier than the pure air circulates along an inside of the cyclone body 101 as the contaminants move to the other end of the cyclone body where the contaminants are discharged into the dust box 105 through the dust outlet 104. On the other hand, the pure air, drawn into the cyclone body 101 in the tangential direction and separated from the contaminants by the centrifugal force, enters into the two inlets of the 'T' air outlet tube 103 substantially by half and half, mixed therein again, and discharged through one outlet. In this instance, if the opposite sides of the cyclone body 101 are flat, the suction force from the inlet of the air outlet tube causes vibration of the sides, the convex sides of the cyclone body 101 of the present invention make no vibration. That is, during the air discharge through the air outlet tube 103, the suction force applied to the opposite sides of the cyclone body 101 is not applied an entire surface of the sides, but focused onto a center of the curved side, the vibration of opposite sides of the cyclone body 101 is not occurred in actual air discharge through the air outlet tube 103 during the dust collection operation. In this embodiment, since the air drawn through one air inlet 102 enters into the air outlet tube 103 from two inlets and comes out of the one outlet, a discharge force is dropped by a half in comparison to the suction force, thereby preventing discharge of the fine dust carried on the discharged air.

Figure 10:
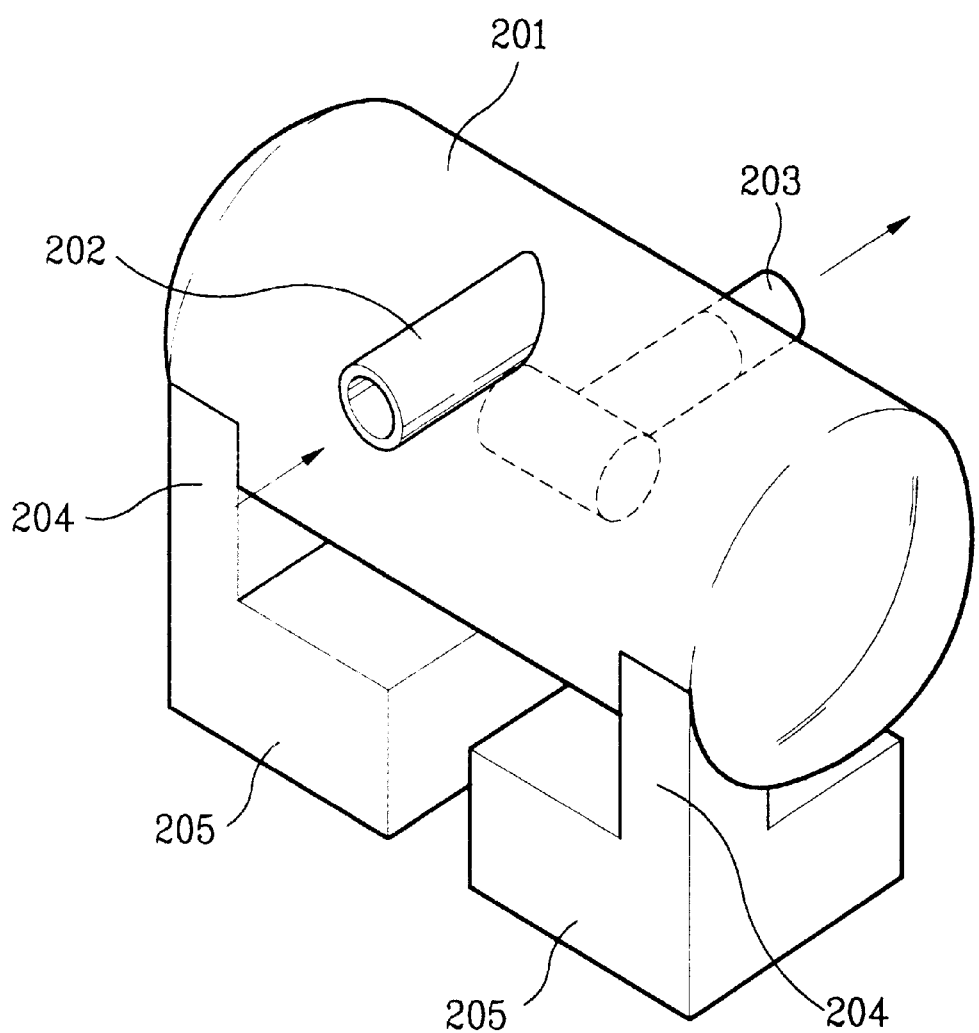
FIG. 10 illustrates a perspective view of a cyclone collector for a vacuum cleaner in accordance with a third preferred embodiment of the present invention.

A cyclone collector for a vacuum cleaner in accordance with a third preferred embodiment of the present invention will be explained with reference to FIGS. 10 and 11. FIG. 10 illustrates a perspective view of a cyclone collector for a vacuum cleaner in accordance with a third preferred embodiment of the present invention, and FIG. 11 illustrates a front view of the cyclone collector for a vacuum cleaner shown in FIG. 10.

Figure 11:
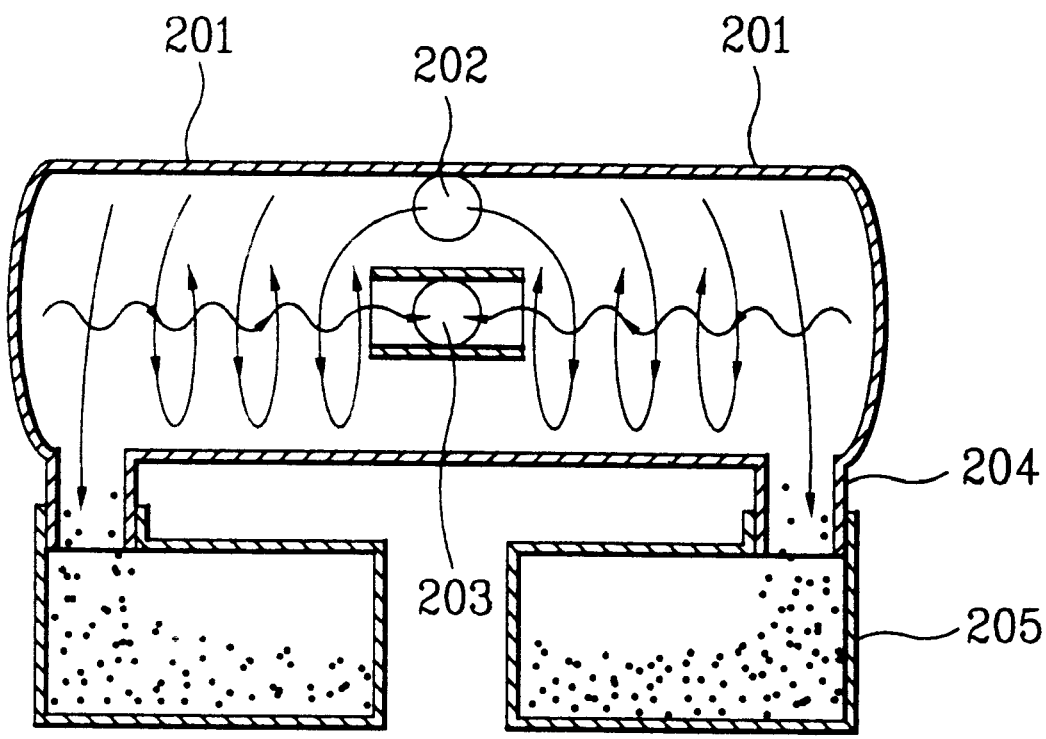
FIG. 11 illustrates a front view of the cyclone collector for a vacuum cleaner shown in FIG. 10.

Referring to FIGS. 10 and 11, the cyclone collector for a vacuum cleaner in accordance with a third preferred embodiment of the present invention includes a cylindrical cyclone body 201 having the same diameter in all length of the cyclone body, an air inlet 202 in the middle of the length of the cyclone body 201 for leading the air into the cyclone body 201 in a tangential direction, and an air outlet tube 203 on an center portion of the cyclone body 201 for drawing the air in the cyclone body through opposite inlets in a horizontal direction by half and half and discharging through one outlet. The air outlet tube 203 has a 'T' form with two inlets and one outlet. And, there are dust outlets 204 at opposite ends of the length of the cyclone body 201 for discharging the contaminants drawn into the cyclone body with air by half and half substantially in the tangential direction through different paths, dust boxes 205 detachably fitted to ends of the dust outlets for collecting the contaminants discharged through the dust outlets 204. And, the convex opposite sides of the cyclone body 201 converge the air to be discharged to the opposite inlets of the air outlet tube 203. Alike the first embodiment, the second embodiment also has forward direction air inflow and outflow, with a significant pressure loss reduction. Different from the second embodiment, since the air inlet 202 is provided in the middle of the length of the cyclone body 201 in the third embodiment of the present invention, the air flow is divided into two, and, according to this, the dust outlets 204 connected to both sides of the cyclone body in a tangential direction and the dust collecting boxes 205 connected to the dust outlets can be provided, separately. Alike the foregoing embodiments, the third embodiment also has forward direction air inflow and outflow, with a significant pressure loss reduction. And, since the air introduced through the one air inlet 202 is drawn into the two inlets of the air outlet tube 203 by half and half and discharged through one air outlet, an air discharge force is reduced below one half of the suction force, thereby preventing the fine dust from being discharged carried by the discharge air.

Figure 12:
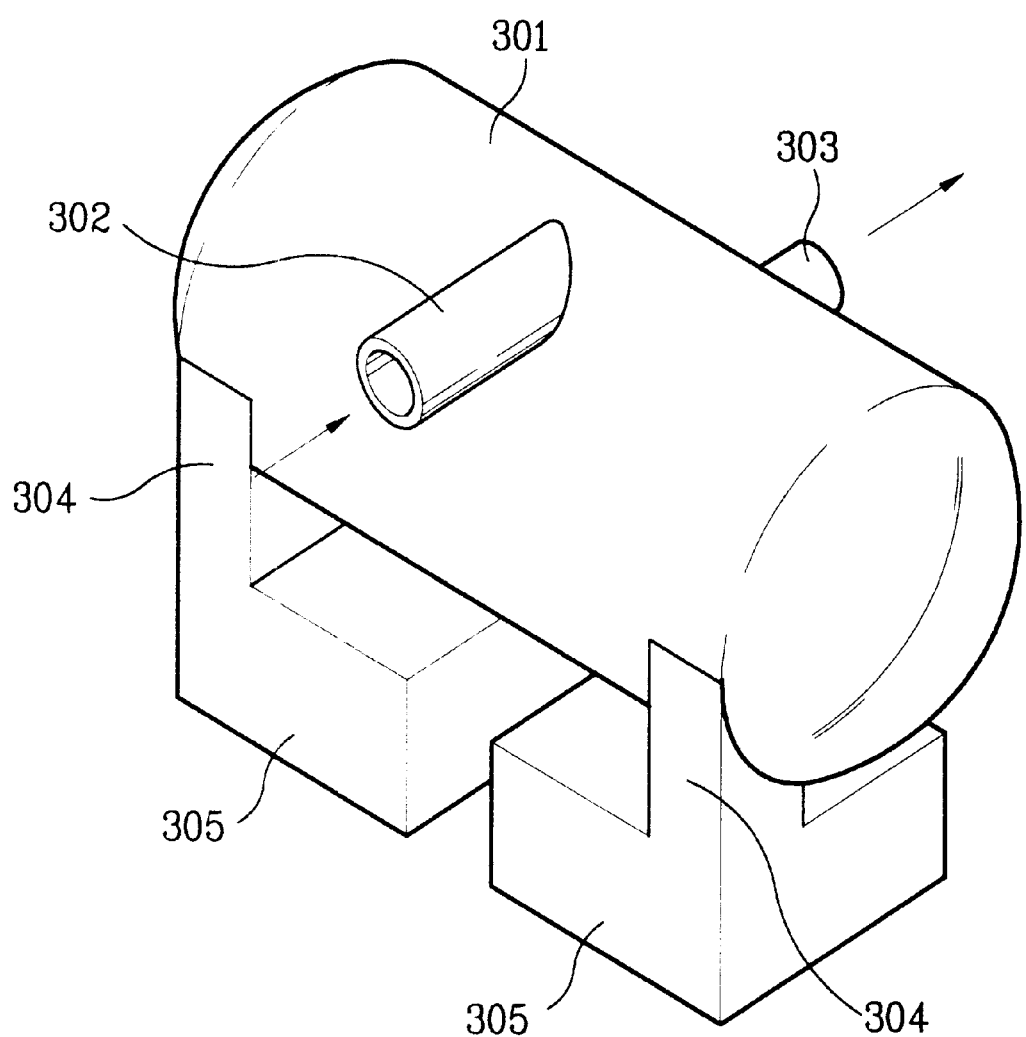
FIG. 12 illustrates a perspective view of a cyclone collector for a vacuum cleaner in accordance with a fourth preferred embodiment of the present invention; and, FIG. 13 illustrates a perspective view of the cyclone collector in FIG. 12, with a partial cut-away view showing an inner structure.

The cyclone collector for a vacuum cleaner in accordance with a fourth preferred embodiment of the present invention will be explained with reference to FIGS. 12 and 13. FIG. 12 illustrates a perspective view of a cyclone collector for a vacuum cleaner in accordance with a fourth preferred embodiment of the present invention, and FIG. 13 illustrates a perspective view of the cyclone collector in FIG. 12, with a partial cut-away view showing an inner structure.

Figure 13:
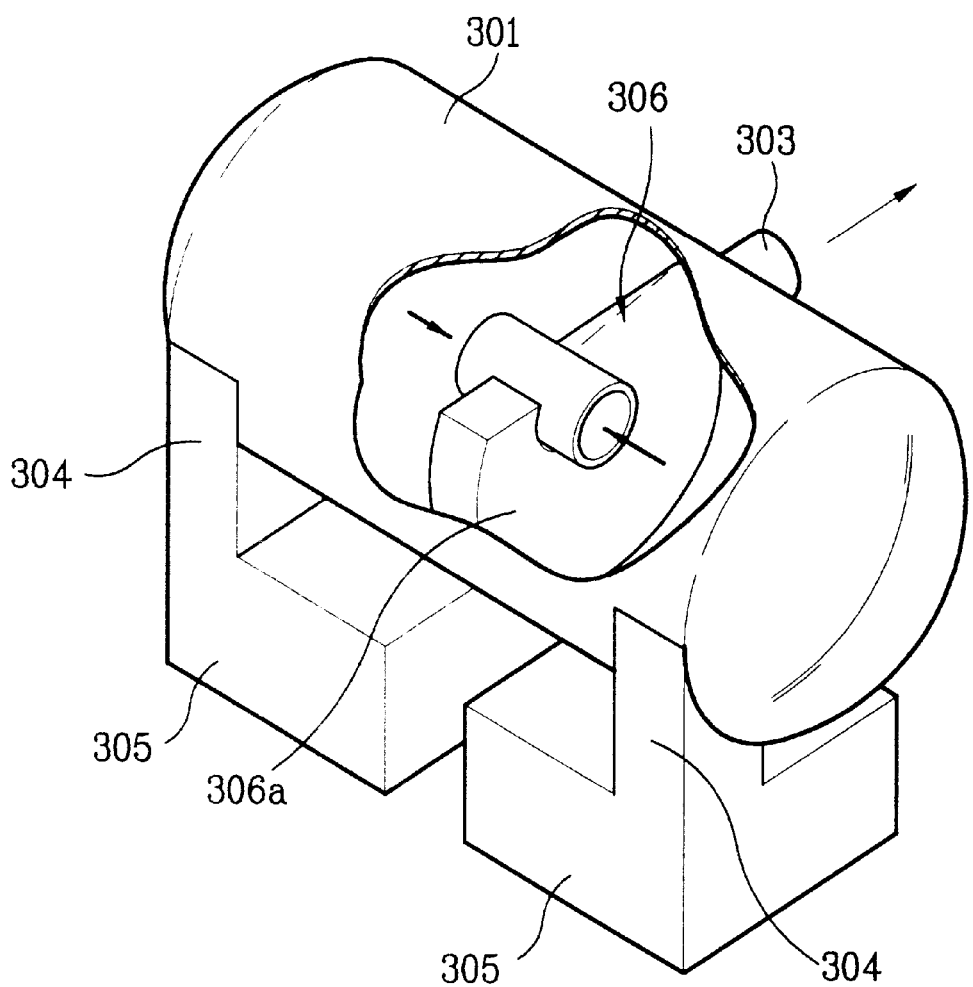

Referring to FIGS. 12 and 13, the cyclone collector for a vacuum cleaner in accordance with a fourth preferred embodiment of the present invention has a system identical to the third embodiment except the fourth embodiment includes a flow dividing guide 306 for dividing an air flow drawn through the air inlet 302 into two portions. The flow dividing guide 306 consists of two helical guide plates which connect an area between an inside surface of the cyclone body 301 and the air outlet tube 303 having a distance to each other gradually becoming the farther as it goes from the outlet of the air inlet 302. The flow dividing guide 306 is formed started from the outlet of the air inlet 302 near to opposite of the air inlet 302 along an inside circumference of the cyclone body. The flow dividing guide 306 of the foregoing structure can divide the air introduced into the cyclone body 301 into two effectively. That is, the air containing the contaminants just coming out of the air inlet 302 is divided by both surface of the guide plate 306a of the flow dividing guide 306 right away, wherein the air is, not only merely divided, but also effectively guided so that the divided air is directed to the opposite ends of the cyclone body 301. The reason that the air, divided by the flow dividing guide 306, is guided to the opposite ends of the cyclone body 301 more effectively is that the opposite guide plates 306a are formed such that a distance between the guide plates 306a become the greater as it goes the farther from the outlet of the air inlet 302. Alike the foregoing embodiments, the fourth embodiment also has forward direction air inflow and outflow, with a significant pressure loss reduction. And, since the air introduced through the one air inlet 302 is drawn into the two inlets of the air outlet tube 303 by half and half and discharged through one air outlet, an air discharge force is reduced below one half of the suction force, thereby preventing the fine dust from being discharged carried by the discharge air.

INDUSTRIAL APLICABILITY

The improvement in the air suction flow structure in the cyclone body of the cyclone collector of the present invention provides the following advantages.

First, the smooth forward direction flow of the air can reduce a pressure loss significantly, with an improved dust collecting efficiency and a reduction of noise since there is almost no resistance from discharging current of air in the cyclone body.

Second, since the air introduced through one air inlet is discharged with the air divided into two portions, with an air discharge force reduced by below one half of the suction force, discharge of fine dust carried on the discharge air is prevented, thereby dispensing with a separate dust filter in the body of the vacuum cleaner.

Third, the disposal of the dust collector(s) for collecting contaminants side by side with the cyclone body permitted by the present invention permits detachment of the dust box leaving the cyclone body intact in removal of the dust in the dust box, which enhances convenience in handling and managing the vacuum cleaner.

Fourth, the low overall height of the cyclone collector is favourable in making the cleaner compact as the body of the vacuum cleaner does not become larger even if the cyclone collector of the present invention is applied to a canister type vacuum cleaner.

Thus, the present invention has very favorable industrial applicability.

It will be apparent to those skilled in the art that various modifications and variations can be made in the cyclone collector for a vacuum cleaner of the present invention without departing from the spirit or scope of the invention. Thus, it is intended that the present invention cover the modifications and variations of this invention provided they come within the scope of the appended claims and their equivalents.

What is claimed is:

1. A cyclone collector for a vacuum cleaner comprising:

a cylindrical cyclone body;

an air inlet connected in the middle of an outer circumference of the cyclone body in a tangential direction;

dust outlets connected to both ends of the outer circumference of the cyclone body in a tangential direction;

a dust box in communication with the dust outlets for collecting dust coming through the dust outlets;

a pair of air outlet tubes for discharging an air inside of the cyclone body; and a guide piece provided in the middle of an inside surface of the cyclone body, the guide piece having a length in a circumferential direction that the air flows inside the cyclone body, for smoothly dividing and guiding the air drawn through the air inlet to the air outlet tubes, respectively.

2. The cyclone collector as claimed in claim 1, wherein the air outlet tubes are provided through longitudinal end sides of the cyclone body, respectively.

3. The cyclone collector as claimed in claim 2, wherein the air outlet tubes has a cylindrical form disposed on an axis direction of the cyclone body.

4. The cyclone collector as claimed in claim 2, wherein the air discharged through respective air outlet tubes come together into one flow at a place outside of the cyclone body.

5. The cyclone collector as claimed in claim 1, wherein the guide piece has a cross-section at a point along the length in a form curved to both sides starting from a top point of the cross-section.

6. The cyclone collector as claimed in claim 1, wherein the guide piece has a height which gradually increases along the length of the guide piece.

7. The cyclone collector as claimed in claim 1, wherein the guide piece has a contact width 'b' which gradually increases along the length of the guide piece.

8. The cyclone collector as claimed in claim 1, further comprising a partition plate inside of the dust box for dividing an inside space thereof.

9. A cyclone collector for a vacuum cleaner comprising:

a cylindrical cyclone body;

an air inlet in one end of an outer circumference surface of the cyclone body for drawing air and contaminants into the cyclone body in a tangential direction;

an air outlet tube on a center portion of the cyclone body having two inlets and one outlet for discharging the air separated by a centrifugal force from the air and contaminants drawn into the cyclone body;

a dust outlet connected to the other end of the outer circumference surface of the cyclone body for discharging contaminants separated by the centrifugal force from the air and contaminants drawn into the cyclone body; and, a dust box detachably coupled to the dust outlet for collecting the discharged dust.

10. The cyclone collector as claimed in claim 9, wherein the air outlet tube has a 'T' form having two inlets and one outlet.

11. The cyclone collector as claimed in claim 9, further comprising a partition plate inside of the dust box for dividing an inside space thereof.

12. The cyclone collector as claimed in claim 9, wherein opposite ends of the cyclone body are convex outwardly.

13. A cyclone collector for a vacuum cleaner comprising:

a cylindrical cyclone body;

an air inlet tube connected to the cyclone body in a tangential direction for guiding an air;

dust outlets in a side of both ends of the cyclone body;

dust boxes in communication with the dust outlets for collecting the dust; and, an air outlet tube on a center portion of the cyclone body having two inlets opened to opposite directions, and one outlet adapted to put the air centered into the two inlets together and connected to a motor, for discharging the air flowing in the cyclone body.

14. The cyclone collector as claimed in claim 13, further comprising a flow dividing guide provided in the cyclone body, the flow dividing guide having a length in a circumferential direction that the air flows inside the cyclone body for guiding the air introduced into the cyclone body through the air inlet so that the air is divided and flown into opposite spaces in the cyclone body.

15. The cyclone collector as claimed in claim 14, wherein the flow dividing guide connects an area between an inside space of the cyclone body and the air discharge tube, with two helical guide plates having a distance to each other which gradually increases along the length of the flow dividing guide.

16. The cyclone collector as claimed in claim 15, wherein the helical guide plates are formed starting from the outlet of the air inlet tube extended along an inside circumference of the cyclone body near to an opposite side of the air inlet.

17. The cyclone collector as claimed in claim 13, wherein the cyclone body has outward convex end sides.

* * * * *